No. 763,445. PATENTED JUNE 28, 1904.
F. VOGELZANG.
DEVICE OR TOOL FOR TIGHTENING FENCE WIRES.
APPLICATION FILED JUNE 1, 1903.
NO MODEL.

Witnesses.
K. K. Keffer.
C. G. Hague.

Inventor: Frank Vogelzang.
by W. C. Leonard, Attorney.

No. 763,445.  
Patented June 28, 1904.

UNITED STATES PATENT OFFICE.

FRANK VOGELZANG, OF ROCK VALLEY, IOWA.

DEVICE OR TOOL FOR TIGHTENING FENCE-WIRES.

SPECIFICATION forming part of Letters Patent No. 763,445, dated June 28, 1904.

Application filed June 1, 1903. Serial No. 159,672. (No model.)

*To all whom it may concern:*

Be it known that I, FRANK VOGELZANG, a citizen of the United States, residing at Rock Valley, in the county of Sioux and State of Iowa, have invented certain new and useful Improvements in Devices or Tools for Tightening Wire, of which the following is a specification.

The objects of my invention are to provide an implement of simple, durable, and inexpensive construction which an operator may place against a fence-wire between two posts and quickly and easily stretch the wire tightly between the posts and form a twisted loop in the wire, thus securely holding the wire in its stretched position.

My invention consists in certain details in the construction, arrangement, and combination of the various parts of the device whereby the objects contemplated are attained, as hereinafter more fully set forth, pointed out in my claim, and illustrated in the accompanying drawings, in which—

Figure 1:
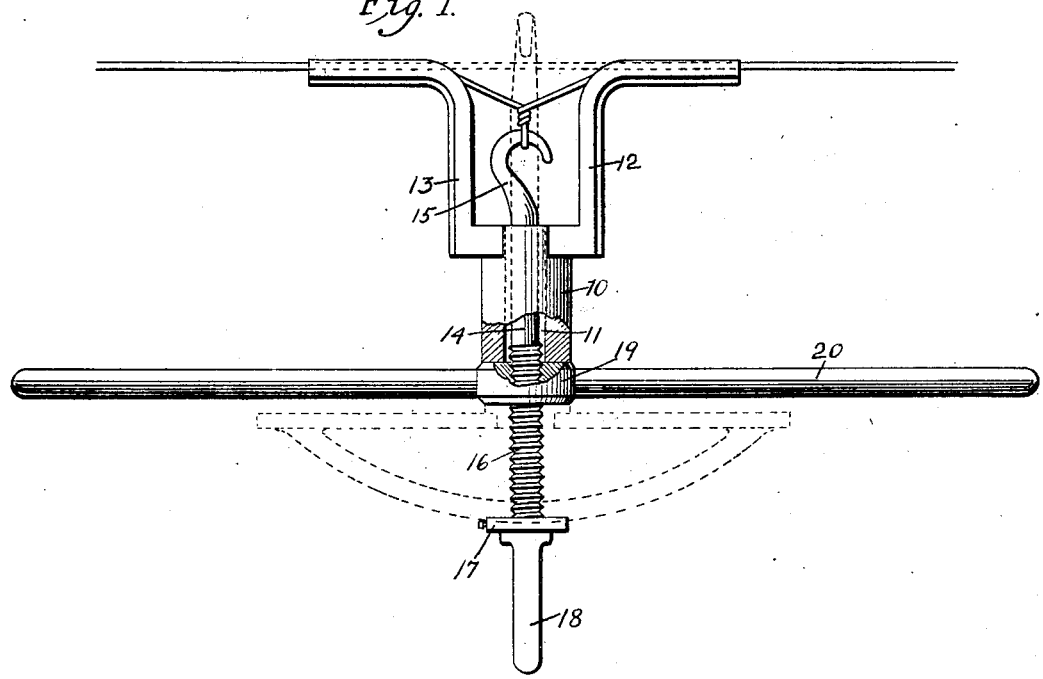
Figure 2:
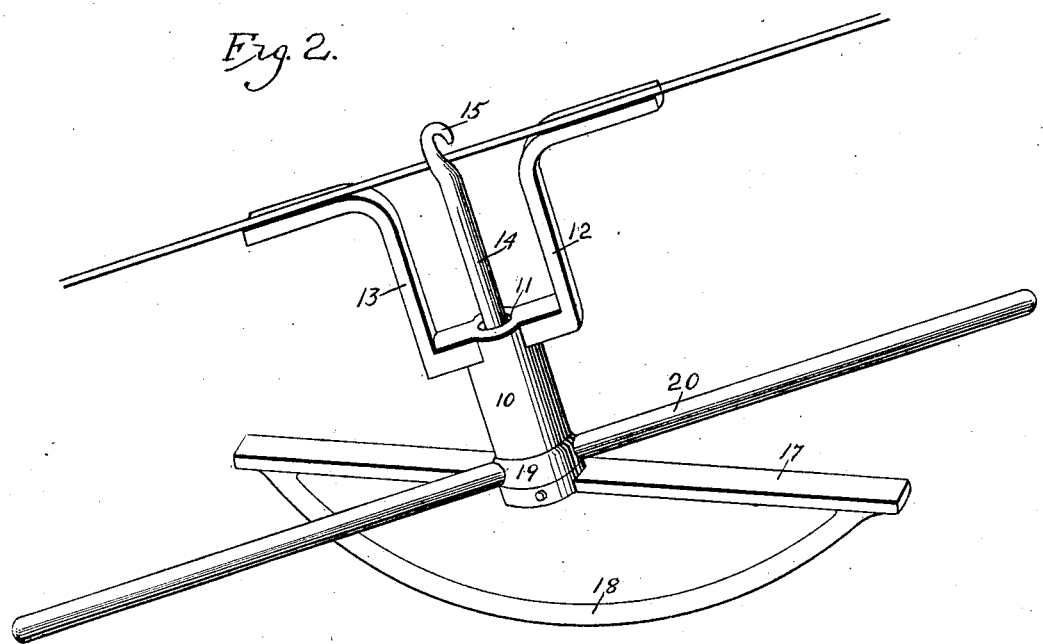

Figure 1 shows a top or plan view of the implement in engagement with a fence-wire. The dotted lines indicate the position that the movable parts assume before the hook engages the wire, part of the device being broken away to show certain details of construction. Fig. 2 shows a perspective view of the implement in position ready to attach the hook to a fence-wire.

Referring to the accompanying drawings, I have used the reference-numeral 10 to indicate the cylindrical body portion of the frame. This body portion is provided with a central opening 11, having a smooth interior. Formed on one end of the frame are two arms 12 and 13, projecting first outwardly from the cylindrical body portion, then parallel therewith, their outer ends inclined at right angles to the longitudinal axis of the body portion, said outer ends of the arms having concave outer faces to receive a fence-wire.

The reference-numeral 14 indicates a round rod having a hook 15 formed at one end and having a screw-threaded portion 16 at its other end. Attached to the end of the rod 14 opposite from the hook is a handle-bar 17. This handle-bar 17 is provided with a handle-grip 18.

Mounted upon the screw-threaded portion of the rod 16 is a nut 19, provided with two long heavy handles 20, extended in opposite directions from the nut, said handles 20 being materially longer than the length of the handle-bar 17. In assembling the device the screw-threaded end of the rod 14 is passed through the hollow cylindrical body portion 10, then the nut 19 is placed on the screw-threaded end, and finally the handle-bar 17 is placed on the screw-threaded end and there secured.

In practical use I place the concave ends of the arms 12 and 13 against a fence-wire, the implement being held by the operator grasping the cylinder 10 in one hand and the grip 18 of the handle 17 in the other hand. In this position the operator turns the hook 15 by means of the grip 18 until said hook is in position to engage the wire. He then draws the hook toward the outer end of the cylinder 10, thus drawing a part of the fence-wire between the arms 12 and 13. This movement of the hook draws the nut 19 a short distance away from the cylinder 10. Then the operator may by grasping one of the handles 20 quickly and easily turn the nut 19 to position where it will engage the adjacent end of the cylinder 10. When this is done, the implement is firmly held in position on the fence-wire, and the operator may then with both hands turn the handles 19 until the fence-wire is stretched as tight as desired. Then by holding one of the handles 20 the operator may grasp the grip 18, and thereby turn the hook and twist the portion of the wire between the arms 12 and 13. Then the hook may be withdrawn from the wire, and the wire will remain tightly stretched.

Having thus described my invention, what I claim, and desire to secure by Letters Patent of the United States therefor, is—

A tool for tightening wire, comprising a body portion having a cylindrical portion provided with a smooth longitudinal opening and two arms projecting from one end of the body portion spaced apart and provided with wire-